(12) United States Patent
Elliott

(10) Patent No.: US 6,487,197 B1
(45) Date of Patent: Nov. 26, 2002

(54) METHOD AND APPARATUS FOR CONNECTING TO A PACKET BASED COMMUNICATION SYSTEM

(75) Inventor: Stephen Bennett Elliott, Allen, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/309,722

(22) Filed: May 11, 1999

(51) Int. Cl.[7] ............................................... H04L 12/66
(52) U.S. Cl. .................... 370/354; 375/222; 379/93.34
(58) Field of Search ................................ 370/352–356, 370/493–495, 526–529; 379/142.18, 93.05–93.09, 93.14, 93.15, 96.18, 93.31–93.34

(56) References Cited

U.S. PATENT DOCUMENTS

| | | | |
|---|---|---|---|
| 6,075,784 A | * 6/2000 | Frankel et al. | 370/356 |
| 6,130,893 A | * 10/2000 | Whittaker et al. | 370/420 |
| 6,163,599 A | * 12/2000 | McHale | 379/93.28 |
| 6,212,227 B1 | * 4/2001 | Ko et al. | 375/222 |
| 6,243,377 B1 | * 6/2001 | Phillips et al. | 370/354 |
| 6,320,879 B1 | * 11/2001 | Bremer | 370/493 |
| 6,349,096 B1 | * 2/2002 | Liu et al. | 370/352 |
| 6,356,585 B1 | * 3/2002 | Ko et al. | 375/222 |

OTHER PUBLICATIONS

F. M. Ploumen and L. De Clercq, "The All Digital Loop", IEEE Sep. 2000, pp. 16–21.*
A. D. Roy, "A Second Wind for Wiring", IEEE Sep. 1999, pp. 52–60.*
B. Koyuncu, "PC Remote Control of Appliances by Using Telephone Lines", IEEE vol. 41, No. 1, Feb. 1995, pp. 201–209.*

* cited by examiner

Primary Examiner—Hassan Kizou
Assistant Examiner—Thai Hoang
(74) Attorney, Agent, or Firm—John D. Crane; Bracewell & Patterson, L.L.P.

(57) ABSTRACT

As a telecommunications device goes off-hook a simultaneous connection is made to a local exchange and a data network removing the necessity to dial, or input numbers to access the data network. Upon connection to the local data network, a modem tone is returned to the telecom device. Connection to the local exchange causes a dial tone to be returned to the DSLAM in the local change. The device receives the modem tone, the dial tone is blocked by the DSLAM and a data communication session begins. If the device transmits DTMF signals within 20 seconds, the call reverts to a standard switched call, dropping the connection with the local data network. If no DTMF signals are sent within 20 seconds, the DSLAM releases the connection with the local Exchange and the data communications session continues.

15 Claims, 7 Drawing Sheets

METHOD AND APPARATUS FOR CONNECTING TO A PACKET BASED COMMUNICATION SYSTEM

BACKGROUND OF THE INVENTION

1. Technical Field

The present invention relates in general to an improved wireline (also referred to as circuit) communications system and in particular to wireline communications utilizing packet based telecommunication systems.

2. Description of the Related Art

Going "off-hook" is a term in the telecommunications industry that refers to lifting the telephone handset, or the equivalent, from its cradle. A hookswitch, in the handset, alerts a local central office that the user wants to dial a number. The central office then provides a dial tone to the handset. The user dials or enters numbers that correspond to the telephone number to which the user wishes to connect.

Dual Tone Multi-Frequency ("DTMF") is a term describing push button dialing. When a button on a telephone button pad is touched, a tone (combining two frequencies) is generated. Dialing, or pushing, a telephone number generates a combination of frequencies that the central office interprets as a telephone number. The central office routes the call to the target phone number.

A data call, generated by a modem, is accomplished in much the same way: a) the modem goes off-hook, b) the central office provides a dial tone, c) the modem automatically dials a phone number, d) the central office routes the call to the target number, e) the modem makes a connection with a digital communications device at the target number and f) communications between digital communication devices begins.

A majority of connections made to a telephone service provider are voice connections. A dial tone is provided to an off-hook communications device regardless of the type of device, voice or data. If the device is a analog voice communication device, the tone is a signal that the device is connected with the local switch. The switch provides connection to the target telephone number.

Digital communication with sites on the Internet, or World Wide Web (WWW, a convention for linking together text documents, interactive programs and images over the Internet), is becoming a significant portion of circuit communications. Internet addresses and links, utilizing Hyper-Text Markup Language (HTML) provide the navigation means between sites on the internet. The communications protocol employed by the internet via telecommunication devices is Transmission Control Protocol/Internet Protocol (TCP/IP). TCP/IP, a known packet based protocol, breaks a transmission into information packets and sends the packets to other addresses on the Internet or on an intranet. An intranet, as opposed to the Internet, provides a method of distributing information between different personal computers (PC) within a company on a limited scale, i.e., a local area network (LAN) or wide area network (WAN).

In the wireline world (wireline is also referred to as circuit), Internet and data communications, in general, bypass the wireline switch and revenues are siphoned off to other service providers, limiting the role of local telephone companies (telcos) to access providers. A telco, or access provider, typically provides a subscriber a connection to an Internet Service Provider (ISP) that, in turn, connects to the global Internet. A new type of ISP, cable television, has emerged that provides extremely fast connections to the Internet. This service with its broad bandwidth capability is able to provide very good voice over Internet Protocol transmissions, which will reduce the cost of long distance calls and provide equivalent voice quality. Thus, the future of most long distance data and voice communication is directed at the Internet.

Access to the Internet is generally accomplished by a browser operating on a computer, via modem, through wireline services. A user (also, subscriber) activates a browser, which connects through a modem to dial up an ISP. Connection is made through a local telephone company switch via circuit (wires) to an Internet gateway, in this example an ISP. A modem at the ISP connects with the user's modem and routes/connects the user's computer to the Internet.

An ISP usually has many incoming telephone lines and more customers than telephone lines. Wireline, or circuit, service charges to the ISP are typically based on the number of lines and type of service provided. ISPs commonly charge flat monthly rates that are relatively cheap compared with an equivalent amount of time spent on a voice call. With the advent of Internet telephony, long distance phone calls (voice or analog, not just data) are also being made through the ISP, bypassing the traditional long distance carrier.

Voice networks, including long distance, are generally designed on the proposition that there will be about 10% residential and 20% simultaneous business usage. An average voice call length is generally three minutes. In a study, by Bellcore™ (Bell Communications Research of Morristown, N.J.), the average connect time for an Internet call (data) was 20 minutes and some calls lasted more than 24 hours. According to Bellcore's estimates, the cost to the telephone companies (telco) of moving Internet traffic over the voice network may exceed one billion dollars.

As discussed previously TCP/IP is a packet based protocol and is primarily utilized to transmit data communications. TCP/IP is the communications protocol of the Internet and is the most accepted networking protocol available. Referring to FIG. 4, a block diagram demonstrating a known connection procedure to a packet based communication system, is illustrated. Terminal 400 may be a regular circuit connected telephone, a fax or a modem. Terminal 400, when it goes off-hook, sends an offhook signal to Digital Subscriber Line Access Multiplexer (DSLAM) 402. A function of DSLAM 402 is to recognize and separate voice transmissions from data transmissions and route each to networks that are optimized to support them. Switch 404 is a digital switch within a Local Exchange Carrier (LEC) and switch 404 sends a dial tone to terminal 400 as soon as it receives the offhook signal from DSLAM 402. In this instance, DSLAM 402 receives and transmits DTMF tones dialed by terminal 400 to digital switch 404. DSLAM 402 recognizes DTMF tones and if the tones are associated with an ISP (not shown), switch 404 connects terminal 400, via DSLAM 402, directly to modem pool 406. Modem pool 406 makes connection with a server within the ISP and initiates a data communication session with server 408, within the ISP. Server 408 communicates with terminal 400 until receiving a termination request from 400. Server 408 then sends an acknowledge signal to terminal 400 which then sends an onhook signal to DSLAM 402. DSLAM 402 passes the onhook signal to digital switch 404, and releases the connection from DSLAM 402 to modem pool 406.

If DSLAM 402 does not recognize the received tones as a telephone number for an ISP, digital switch 404 sends a ringback signal to terminal 400, connecting the terminal to the dialed number via the Local Exchange Carrier (LEC) and a voice connection is made. The communications session initiated between terminal 400 and the dialed number continues until terminal 400 goes onhook. This action sends an onhook signal to DSLAM 402 which in turn passes the signal to digital switch 404 and the connection between terminal 400 and the dialed number is ended.

Referring now to FIG. 6, a known system for accessing the Internet via voice and multimedia terminal is illustrated. In this instance, multimedia terminal 602 connects with DSLAM 604 via wireline means. DSLAM 604 routes a transmission from terminal 602 via modem pool 606 which seeks a data communications session with, in this instance, ISP 612. ISP 612 then makes connection to either internal intranet servers 613 or provides a portal to the Internet 614 and routes the transmission accordingly. Alternatively, if the call were a voice call, the call would be routed through DSLAM 604 via voice circuit (wires) and through digital switches in central office 608 of a local exchange to circuit network 610.

In summary, wireline operators are redefining the telecommunications market and the competition within that market. The demand for bandwidth in the wireline marketplace has exploded, requiring major reconstruction of existing networks and developing other means for carrying the increasing voice and data traffic, such as voice and data utilizing cable modems to access the Internet.

It would be desirable to provide a method and apparatus that would provide telcos (regional and national telephone systems, all referred to as telcos) options that would allow a telco operator to provide a system capable of supporting current data and voice traffic and simultaneously providing for easy transition to developing communication means such via the Internet. It would also be desirable to provide a method and apparatus wherein a data communications function is the initial connection between a communications device and a telco network.

SUMMARY OF THE INVENTION

It is therefore one object of the present invention to provide a method and apparatus for supporting multiple connection standards in a communications system, with the initial connection being a data communications function.

It is another object of the present invention to provide a method and apparatus that will act as a means of transitioning from a present day switches and wire environment to a cable modem "always on" environment.

As a telecommunications device goes off-hook a simultaneous connection is made to a local exchange and a data network removing the necessity to dial, or input numbers to access the data network. Upon connection to the local data network, a modem tone is returned to the telecom device. Connection to the local exchange causes a dial tone to be returned to the DSLAM in the local exchange. The device receives the modem tone, the dial tone is blocked by the DSLAM and a data communication session begins. If the device transmits DTMF signals within 20 seconds, the call reverts to a standard switched call, dropping the connection with the local data network. If no DTMF signals are sent within 20 seconds, the DSLAM releases the connection with the local Exchange and the data communications session continues.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
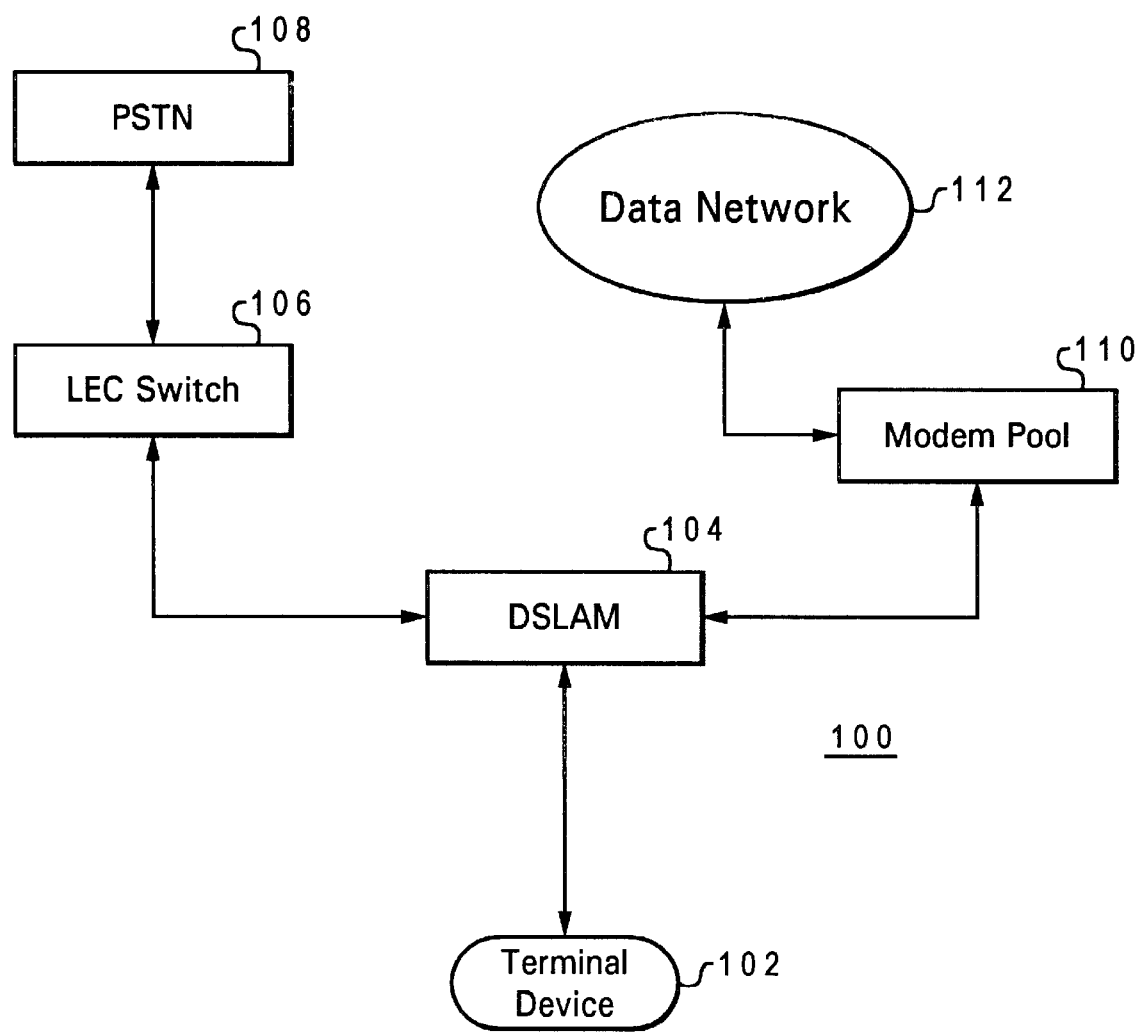
FIG. 1 depicts a high-level block diagram of a front end of a communications system in which a preferred embodiment of the present invention may be implemented.

With reference to the figures, and in particular with reference to FIG. 1, a block diagram of a front end of a communications system in which a preferred embodiment of the present invention may be implemented, is depicted. Communications system 100, comprises terminal 102, DSLAM 104, Local Exchange Carrier (LEC) digital switch 106, Public Switched Telecommunications Network (PSTN) 108, modem pool 110 and data network 112. Terminal 102 may be a regular circuit based telephone, a personal computer (PC), or a future multimedia telephone device. DSLAM 104 is a multiplexing device, located in a LEC central office, that is currently utilized to separate data traffic from switching traffic. DSLAM 104 is capable of supporting various loop interfacing requirements for both voice and data communication. DSLAM 104 separates voice and data traffic on the basis of dialed numbers. That is, DSLAM 104 translates a dialed number to determine if the call is directed to an Internet Service Provider (ISP). If the call is directed to an ISP, the call is presented to the data network 112 as opposed to the LEC circuit switch. This keeps internet traffic out of the circuit switch, thus minimizing costs of carrying data traffic through the LEC network.

Switch 106, after receiving an off-hook signal from terminal 102 through DSLAM 104, connects a DTMF receiver and returns a dial tone to indicate that the switch is awaiting input from terminal device 102. Terminal device 102 inputs DTMF tones and, as is well known in the art, LEC switch 106 collects the tones, establishes a connection and normally transmits a ring back tone and a voice session commences.

In the present invention, DSLAM 104 provides a simultaneous connection between terminal 102 and both data network 112 and LEC switch 106. In DSLAM 104, dial tone and modem tone are combined logically and if both tones are present, modem tone (as opposed to dial tone) is passed on to terminal 102. The transmit path remains enabled to both LEC switch 106 and modem pool 110. In other words, modem pool 110 remains active for a period of time waiting for a further signal from the LEC switch. LEC switch 106 listens on the transmission path through DTMF receiver (not shown) and ignores modem tones. If terminal 102 outputs dialed digits in the form of DTMF tones or equivalent functional signaling, the DTMF receiver recognizes dialed digits and system 100 reverts to the present art and connects terminal 102 to switch 106 and subsequently to PSTN 108. If terminal 102 does not assert dialed digits within 20 seconds switch 106 connection is dropped and a data session with the connected data network 108 continues.

Generally a data session is just that, a session of transmitting and receiving data. With the advent of Voice over Internet Protocol (packet based voice communications over data networks) a data session could be a voice communication. As terminal 102 ends the data session, a request for termination of the session is sent to data network 112, which then transmits acknowledgment and terminal 102 goes on-hook and the session terminates.

Figure 2:
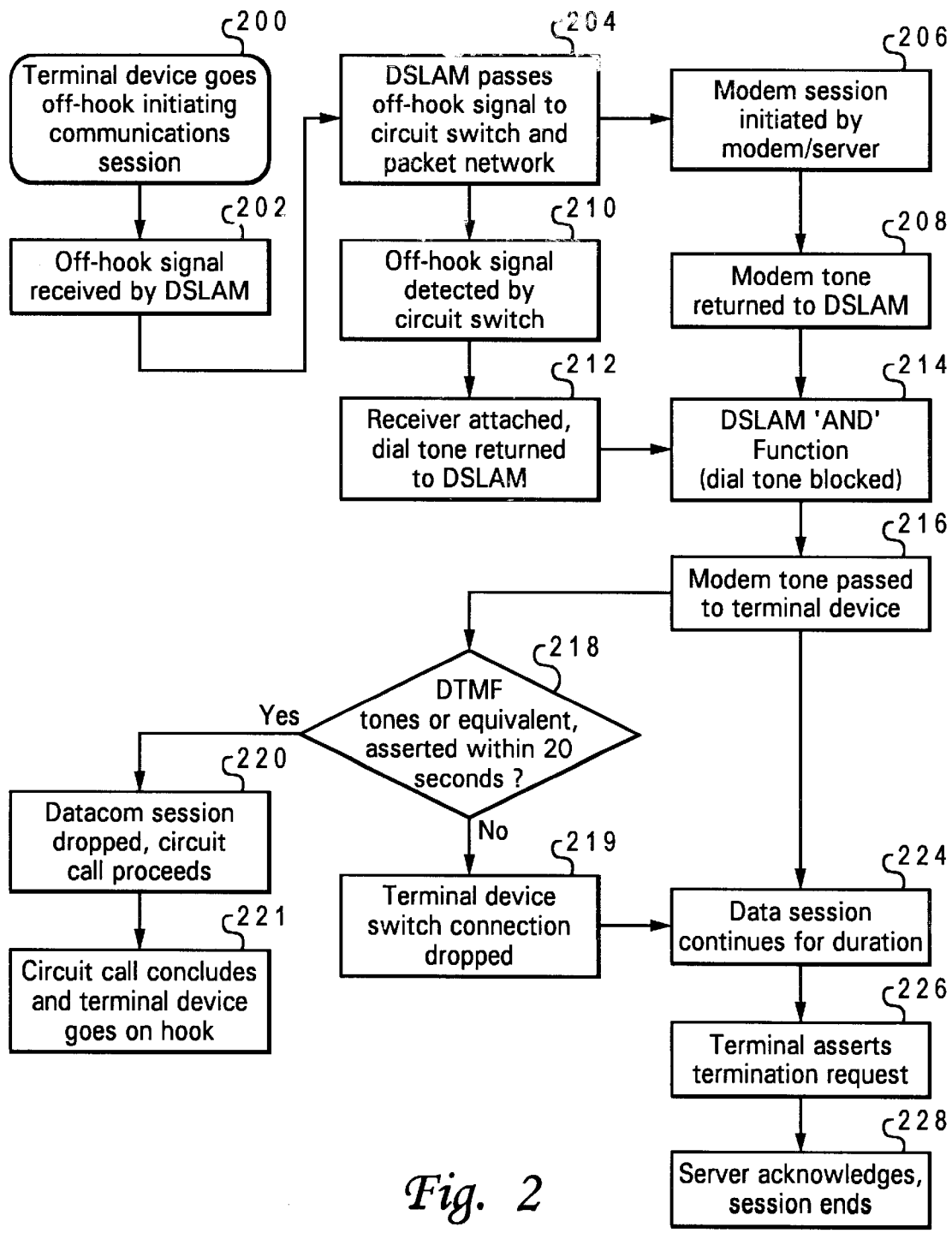
FIG. 2 is a high-level flow diagram of a method for arbitrating between a circuit and packet network, in accordance with a preferred embodiment of the present invention.

Referring to FIG. 2, a high-level flow diagram of a method for arbitrating between a circuit and packet network, in accordance with a preferred embodiment of the present invention, is illustrated. The process begins with step 200, which depicts a terminal device (telephone, PC, etc.) going off-hook and initiating a communications session by sending an off-hook signal. The process proceeds to step 202, which illustrates off-hook supervision, or the equivalent functional signaling, being sent via a wire line facility to a DSLAM. The process then passes to step 204, which depicts the DSLAM repeating the supervisory state to a local exchange switch and simultaneously to a packet network interface (in this instance a modem pool/server), thus establishing an active connection with each communications system. The process next proceeds in parallel to step 210, which illustrates the off-hook supervisory status being detected by the LEC circuit switch and simultaneously to step 206, which depicts a modem session being initiated by the modem pool/server. The process then passes in parallel to step 208, which illustrates a modem tone returned to the DSLAM and simultaneously to step 212, which depicts a receiver being attached by the LEC circuit switch and a dial tone being returned to the DSLAM.

The process then proceeds to step 214, which illustrates DSLAM combining signals returned from the LEC circuit switch and the modem pool/server in a logical function. If both signals are present, the dial tone is blocked and only the modem tone is passed. If both signals are not present then the dial tone is passed through. The process next passes to step 216, which depicts modem tone being passed to the terminal device. Simultaneously, the process then proceeds to step 218, which illustrates a determination of whether DTMF tones, or the equivalent, are received by DSLAM within 20 seconds (the normal period a voice circuit waits to determine if a number will be dialed). If DTMF tones are received, the process passes to step 220, which depicts the datacom (data communications) session being dropped and the voice, or circuit call, continuing. If, after the connection to the local exchange is dropped, the subscriber wishes to place a circuit call they must hang up and re-originate the call. The process continues to step 221, which illustrates the conclusion of the circuit call and the terminal device going on-hook.

Returning to step 218, if DTMF tones are not detected within 20 seconds, the process then proceeds to step 219, which depicts the circuit switch connection being dropped. Next the process passes to step 224, which illustrates a data session commencing for the duration of the call. Returning to step 216, the modem tone that is sent to the terminal device via the DSLAM connects the terminal device to the modem pool/server immediately. Though the process simultaneously tests for whether DTMF tones are present, the terminal device is immediately connected to the packet network via DSLAM. The DSLAM waits for confirmation of a data session or a disconnect and continuation of a circuit session.

The process proceeds from step 216 to step 218, which depicts a data session commencing and continuing for the duration of the call. Next the process passes to step 226, which illustrates the terminal device sending a termination request. The process continues to step 228, which depicts the server sending an acknowledge signal and the datacom session ending.

Over 50 percent of homes in North America have Internet access. The access is, for the most part, data oriented services. In the future, due to improving voice transmission via data packet, voice services will also be supported and voice calls will be initiated in much the same way as a data session is initiated today. The present invention removes the dialing process from the necessity of Internet access. As a caller goes offhook a modem session is initiated, thus eliminating the need for DTMF tones for any calls that utilize packet data transmission. Also, the modem tone does not interfere with an analog call. The present invention provides an easy transition from an all analog communications network to an all digital communications network.

Figure 3:
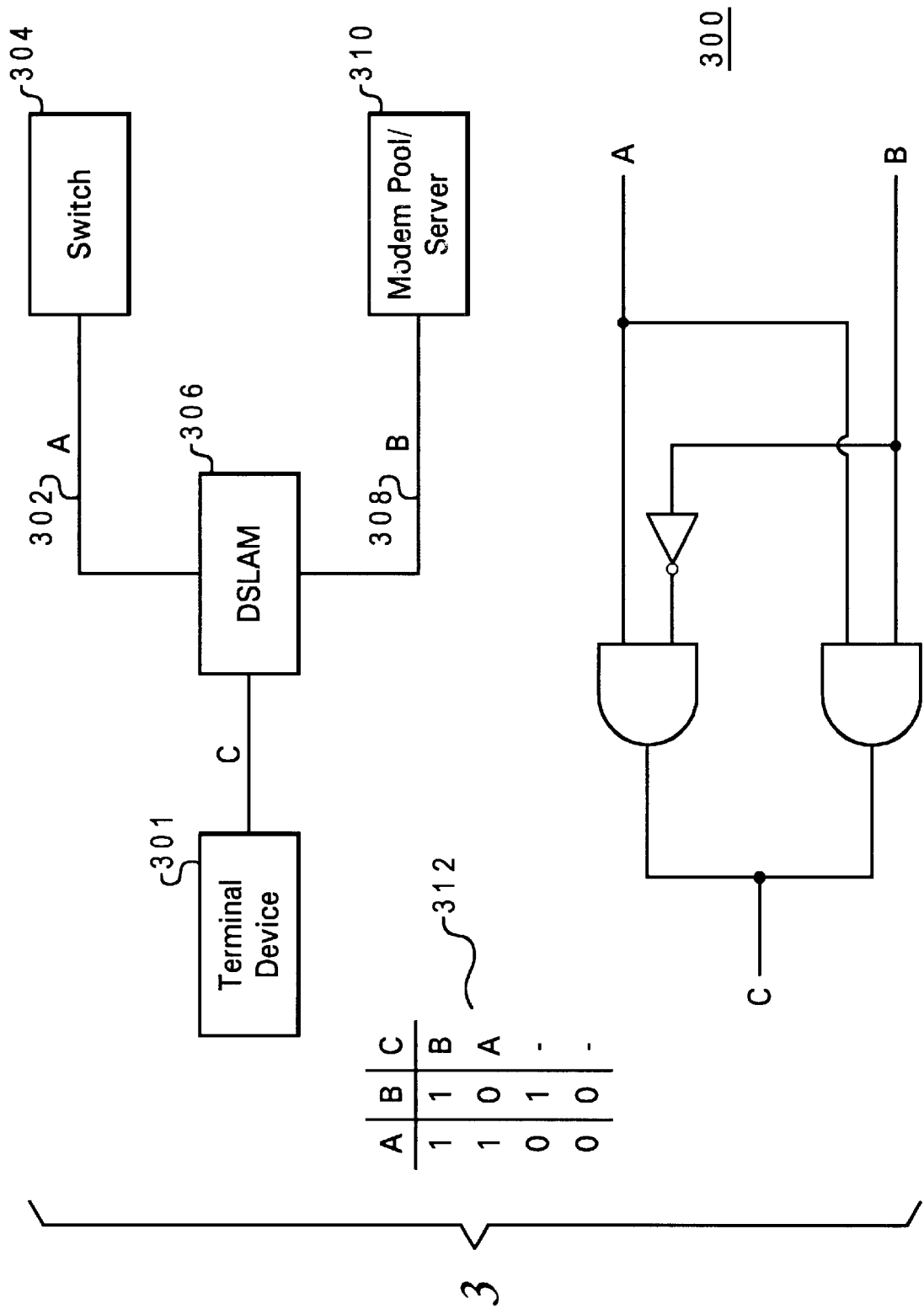
FIG. 3 depicts a block diagram of a logic function in accordance with a preferred embodiment of the present invention.
Figure 4:
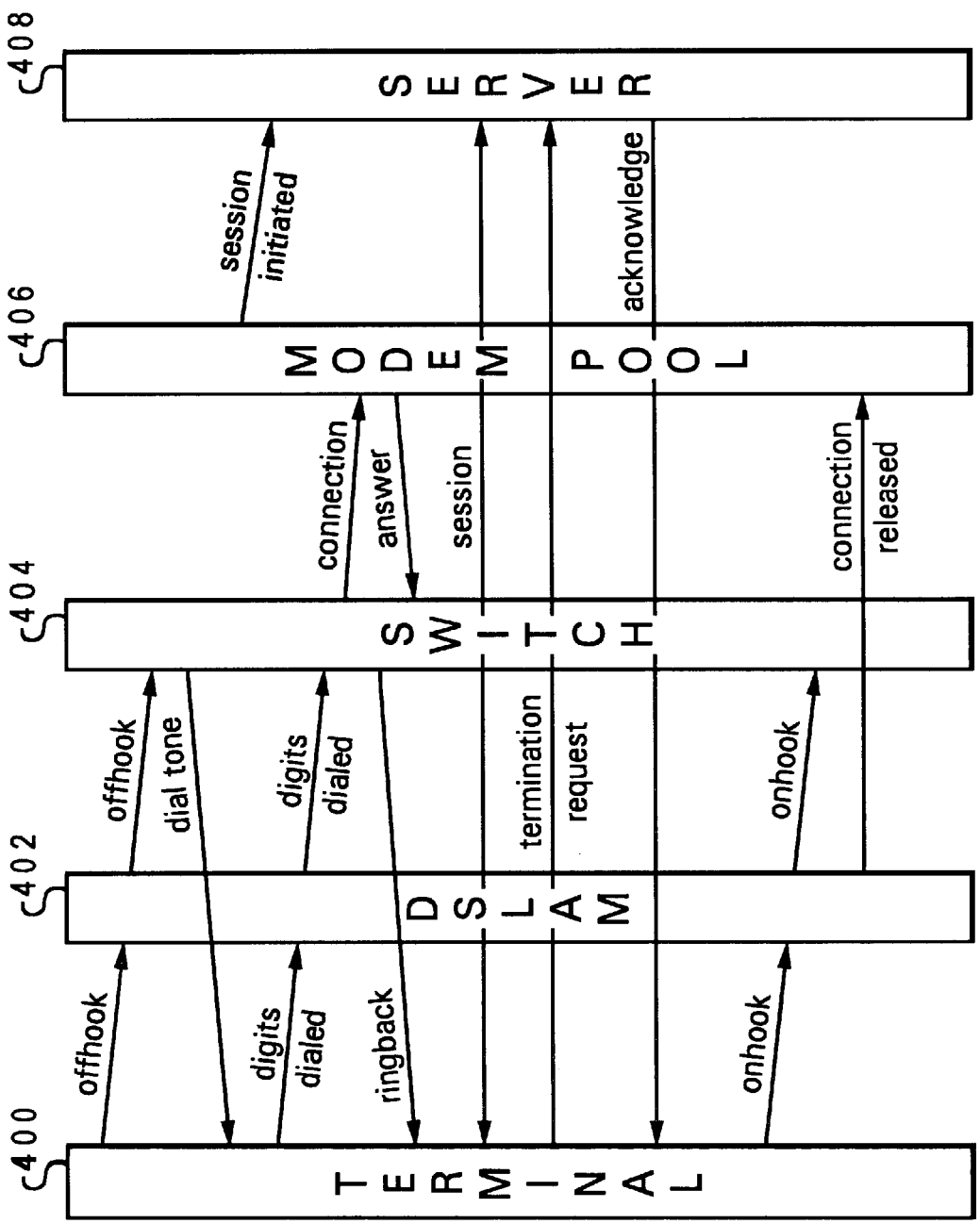
FIG. 4 is a block diagram demonstrating a known connection procedure to a packet based communication system.

Referring now to FIG. 3, a block diagram of a logic function in accordance with a preferred embodiment of the present invention, is depicted. Dial tone is the primary indicator of whether or not telephone service is available when a communications device goes offhook. Dial tone is replaced with modem tone by the present invention, so that a signal tone is still the primary indicator of serviceability. Arbitration between a switched network and a modem pool in a manner that preserves integrity of tone as an indicator of service availability is central to the present invention.

Utilizing known circuitry, as illustrated by gate circuit 300, the arbitration method of the present invention is accomplished by gating dial tone 302 from a digital switch 304 and modem tone 308 from modem pool 310 in DSLAM 306. As shown in table 312, if both dial tone 302 and modem tone 308 are present (both equal 1), then modem tone 308 is passed through to terminal device 301 (subscriber) (C=B). If dial tone 302 is not present (A=0) and modem tone 308 is present (B=1) then modem tone 308 to terminal device 301 is blocked and there is no service available. If dial tone 302 is present (A=1) and modem tone 308 is not present (B=0), then dial tone is passed to terminal device 301 and dial tone 302 is present. Reliability of circuit calling is preserved because if, upon offhook the terminal device receives either dial tone or modem tone, the switching system remains available if it is operational.

Figure 5A:
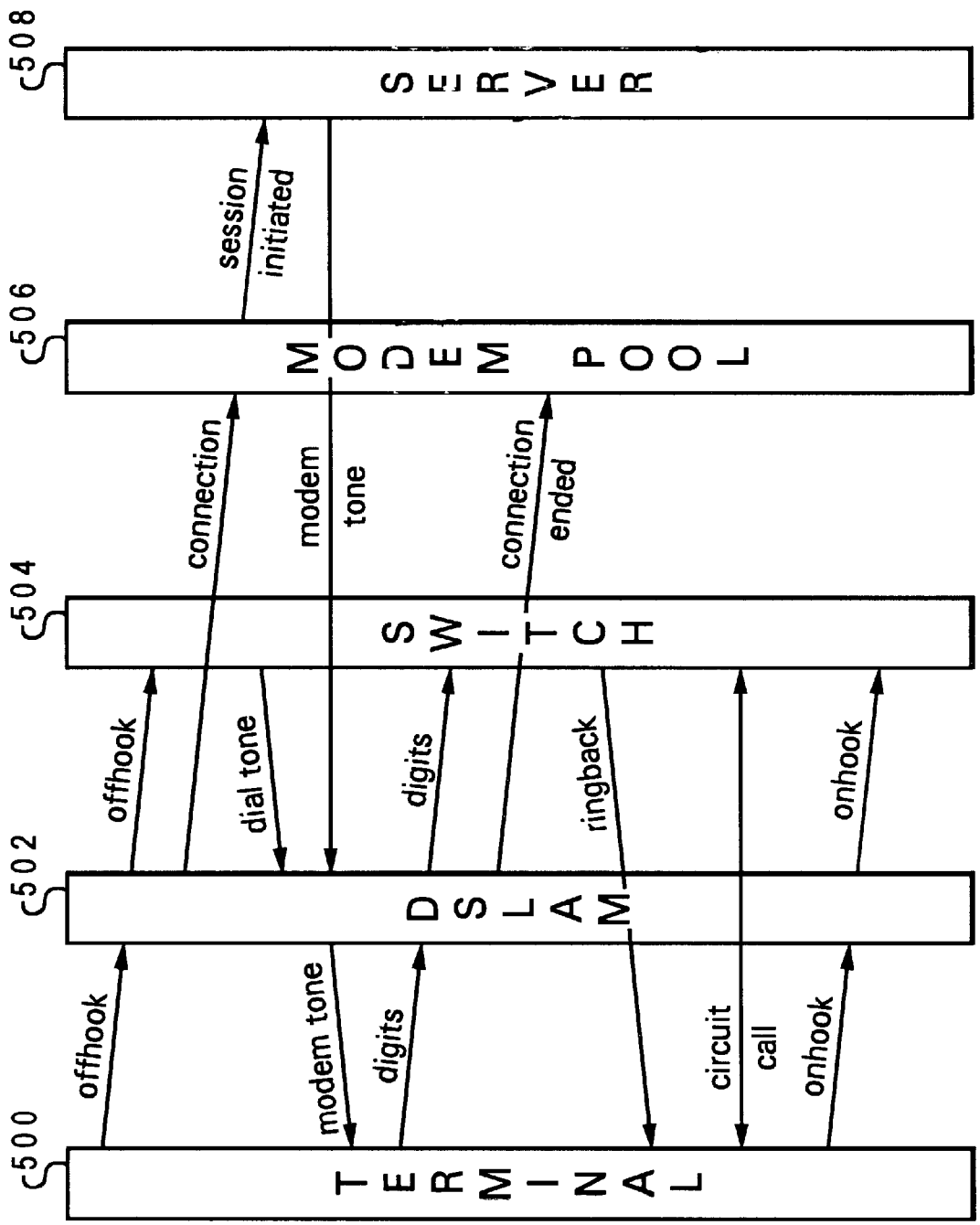
FIG. 5A depicts a high-level block diagram of a circuit (wireline) call in accordance with an embodiment of the present invention.

Referring now to FIG. 5A, a high-level block diagram of a circuit (wireline) call in accordance with an embodiment of the present invention, is depicted. Terminal 500, may be a voice, fax or modem terminal and when terminal 500 goes offhook, a signal is sent to DSLAM 502 in the LEC (not shown). DSLAM 502 sends the signal to digital switch 504. Digital switch 504 sends a dial tone to DSLAM 502, which holds the dial tone signal. DSLAM 502 also connects with modem pool 506 which, in turn connects with server 508. Server 508 returns a modem tone to DSLAM 502 and DSLAM 502 performs a logic function resulting in the modem tone being passed to terminal 500. In the meantime digital switch 504, as is known, monitors the transmission path through a DTMF receiver for DTMF tones and ignores modem tones. If terminal 500 produces DTMF tones, dialed digits, or an equivalent method of signaling, within a specified period (usually 20 seconds), DSLAM 502 releases modem pool 506, switch 504 transmits a ringback signal to terminal 500 and a circuit (wireline) call commences. When terminal 500 transmits an onhook signal, DSLAM 502 receives the signal and transmits the signal to switch 504. Even though a modem tone is generated and passed to the terminal, if DTMF tones (analog call) are detected within a specified period after the offhook signal, an analog call takes precedence.

Figure 5B:
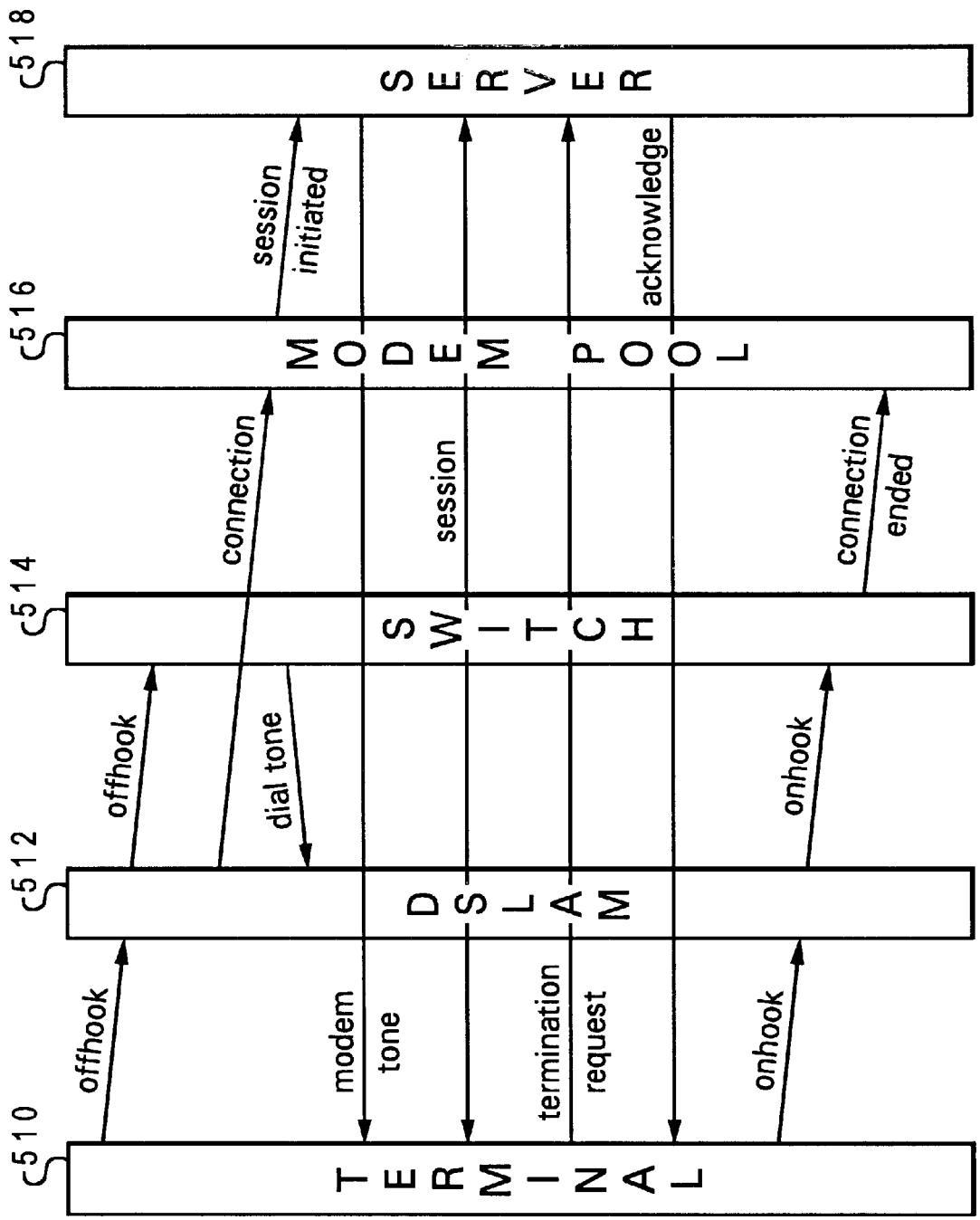
FIG. 5B illustrates a high-level block diagram of a data communications session in accordance with a preferred embodiment of the present invention.
Figure 6:
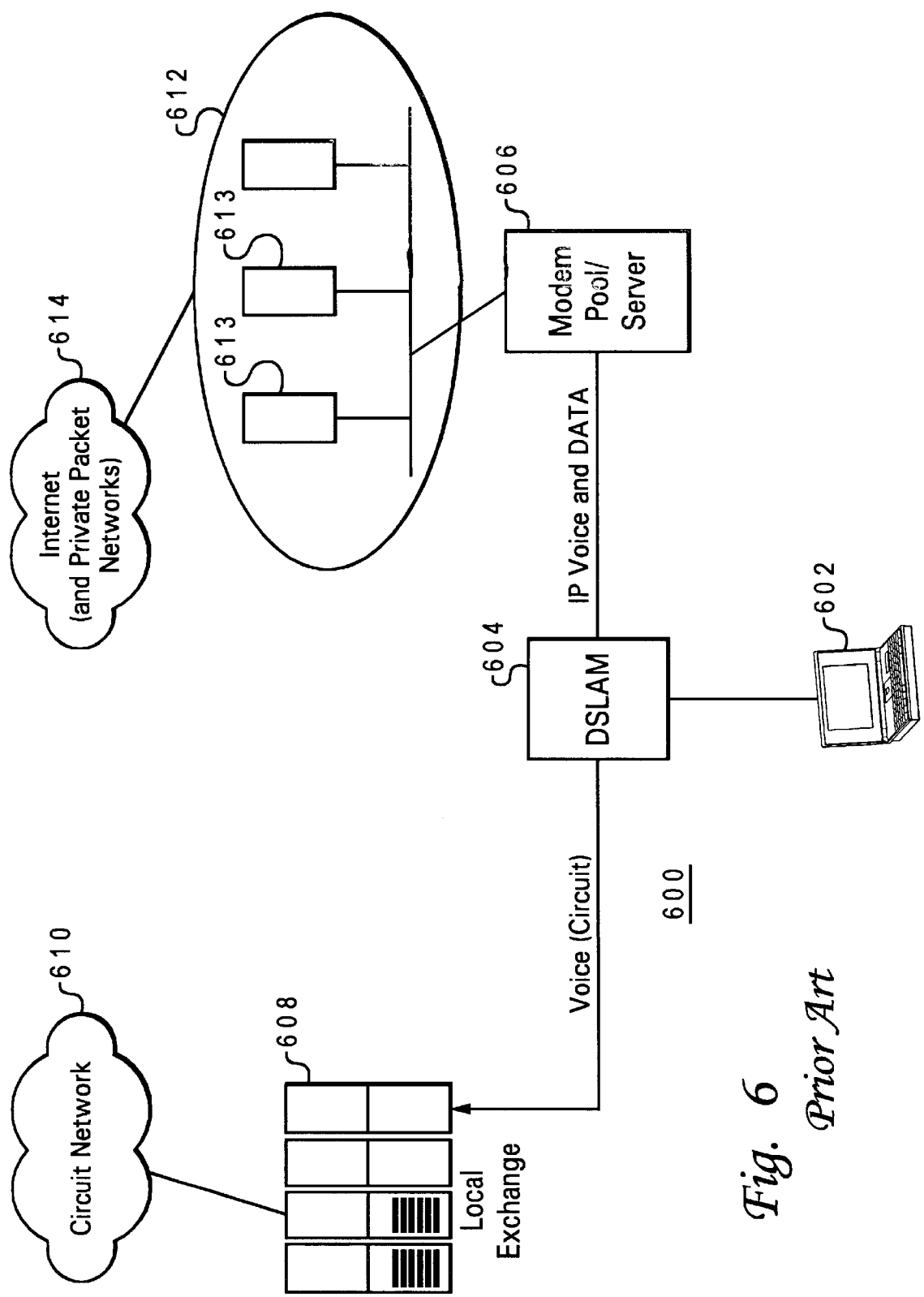
FIG. 6 is a high-level block diagram of a known system for accessing the Internet via voice and multimedia terminal.

Referring to FIG. 5B, a high-level block diagram of a data communications session in accordance with a preferred embodiment of the present invention, is illustrated. Terminal 510 goes off hook and the offhook signal is received by DSLAM 512. DSLAM 512 then sends the signal to digital switch 514 and simultaneously connects with modem pool 516. Switch 514 sends a dial tone to DSLAM 512 which is blocked. At the same time modem pool 516 initiates a session with server 518, and server 518 returns a modem tone to terminal 510 and a data communications session begins.

As discussed in FIG. 5A, switch 514 monitors the transmission through a DTMF receiver for DTMF tones. After twenty seconds, if no DTMF tones are detected, switch 514 connection is dropped and the data communication session continues. At the end of the data session, a termination request is sent from terminal 510 to server 518. Server 518 sends an acknowledgement signal to terminal 510. Terminal 510 then goes onhook and sends an onhook signal to DSLAM 512 which, in turn sends the signal to switch 514 and switch 512 disconnects from modem pool 516.

The present invention, located within a telco, or operator's, network, will removes the need for Internet access to transmit packet based voice communications, because when the terminal goes offhook, a modem session is initiated. Additionally, the present invention allows for analog calls over the same network. As discussed previously, over 50 percent of homes in North America have Internet access and currently, the access is almost exclusively data transmission. With the advent of Internet access by cable modem (cable TV), long distance calls may soon be made via cable modem and Internet. The present invention removes the necessity for dialing to gain access to an ISP and the network. As a caller goes offhook, a modem tone is initiated and eliminates the need for a dial tone if a data session is required. Concurrently, the modem tone will not interfere with an analog call. The present invention provides an easy transition from an all analog communications network to an all digital communications network.

It is important to note that while the present invention has been described in the context of wireless and circuit networks utilizing programmed telecommunication devices, those skilled in the art will appreciate that the mechanism of the present invention is capable of being distributed in the form of an instruction bearing medium in a variety of forms and that the present invention applies equally, regardless of the particular type of signal bearing media utilized to actually carry out the distribution. Examples of instruction bearing media include: non-volatile, hard-coded type media such as read only memories (ROMS) or erasable, electronically programmable read only memories (EEPROMS), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for connecting to a packet based communications system, said method comprising the steps of:
   receiving an off-hook signal from an initiating device;
   simultaneously transmitting said off-hook signal to a digital switch and a modem pool;
   returning a modem tone signal to said initiating device; and
   initiating said packet based communications session.

2. The method of claim 1, further comprising:
   responsive to receipt of a dial tone signal and said modem tone signal, performing a logical 'and' operation with said dial tone and said modem tone.

3. The method of claim 1, further comprising:
   terminating said modem tone signal if a Dual Tone Multi-Frequency (DTMF) tone is detected within a predetermined time period from receipt of said off-hook signal.

4. The method of claim 3, further comprising:
   connecting said initiating device to a terminal device and beginning a communication session.

5. The method of claim 1, further comprising:
   terminating a dial tone signal if no DTMF tone is asserted within a pre-determined time period.

6. An apparatus for connecting to a packet based communications system, said apparatus comprising:
   a Digital Subscriber Line Access Multiplexer (DSLAM) for receiving an off-hook signal from an initiating device and simultaneously transmitting said off-hook signal to a digital switch and a modem pool;
   a modem pool for returning a modem tone signal to said initiating device; and
   a means for initiating said packet based communications session.

7. The apparatus of claim 6, further comprising:
   a logic means for performing a logical 'and' operation with said dial tone and said modem tone.

8. The apparatus of claim 6, further comprising:
   means for terminating said modem tone signal if a Dual Tone Multi-Frequency (DTMF) tone is detected within a predetermined time period from receipt of said off-hook signal.

9. The apparatus of claim 8, further comprising:
   means for connecting said initiating device to a terminal device and beginning a communication session.

10. The apparatus of claim 6, further comprising:
    means for terminating a dial tone signal if no DTMF tone is asserted within a pre-determined time period.

11. A program of instructions for a telecommunications device within an instruction bearing medium for connecting to a packet based communications system, said program of instructions comprising:

instructions within said instruction bearing medium for receiving an off-hook signal from an initiating device;

instructions within said instruction bearing medium for simultaneously transmitting said off-hook signal to a digital switch and a modem pool;

instructions within said instruction bearing medium for returning a modem tone signal to said initiating device; and instructions within said instruction bearing medium for initiating said packet based communications session.

12. The program of instructions of claim 11, further comprising:

instructions within said instruction bearing medium for responsive to receipt of a dial tone signal and said modem tone signal, performing a logical 'and' operation with said dial tone and said modem tone.

13. The program of instructions of claim 11, further comprising:

instructions within said instruction bearing medium for terminating said modem tone signal if a Dual Tone Multi-Frequency (DTMF) tone is detected within a predetermined time period from receipt of said off-hook signal.

14. The program of instructions of claim 13, further comprising:

instructions within said instruction bearing medium for connecting said initiating device to a terminal device and beginning a communication session.

15. The program of instructions of claim 11, further comprising:

instructions within said instruction bearing medium for terminating a dial tone signal if no DTMF tones is asserted within a pre-determined time period.

\* \* \* \* \*